Jan. 24, 1967     B. V. SCHULTZ     3,299,557
PROJECTION TRANSPARENCIES
Filed Jan. 6, 1965     2 Sheets-Sheet 1
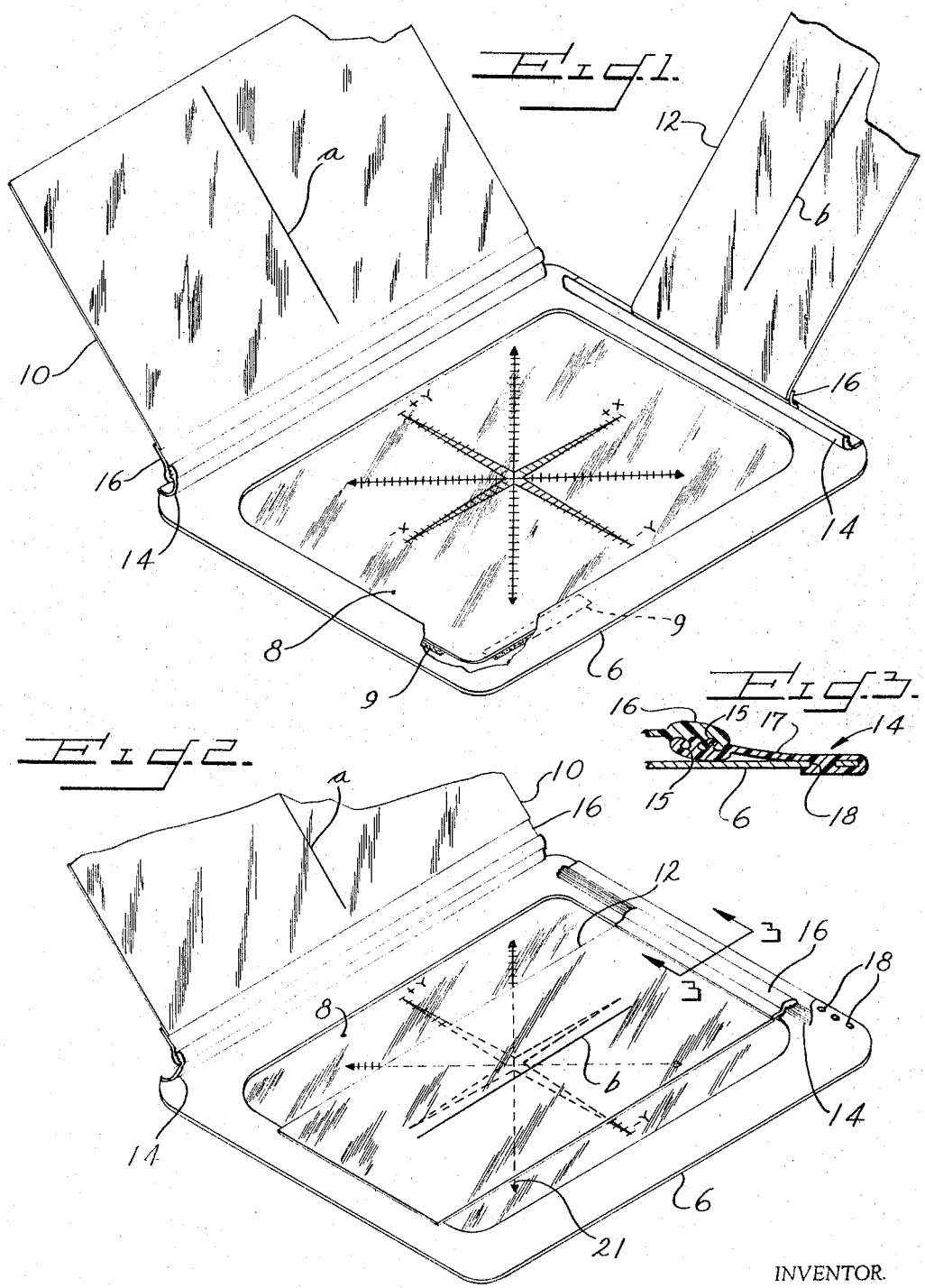
INVENTOR.
BENNETT V. SCHULTZ
BY Chapin & Neal
Attorneys Jan. 24, 1967  B. V. SCHULTZ  3,299,557
PROJECTION TRANSPARENCIES
Filed Jan. 6, 1965  2 Sheets-Sheet 2
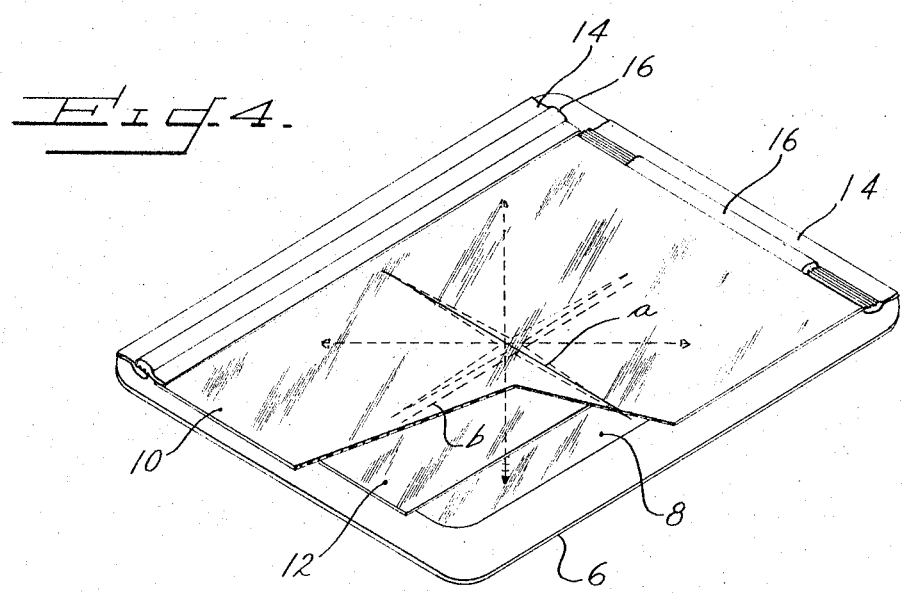
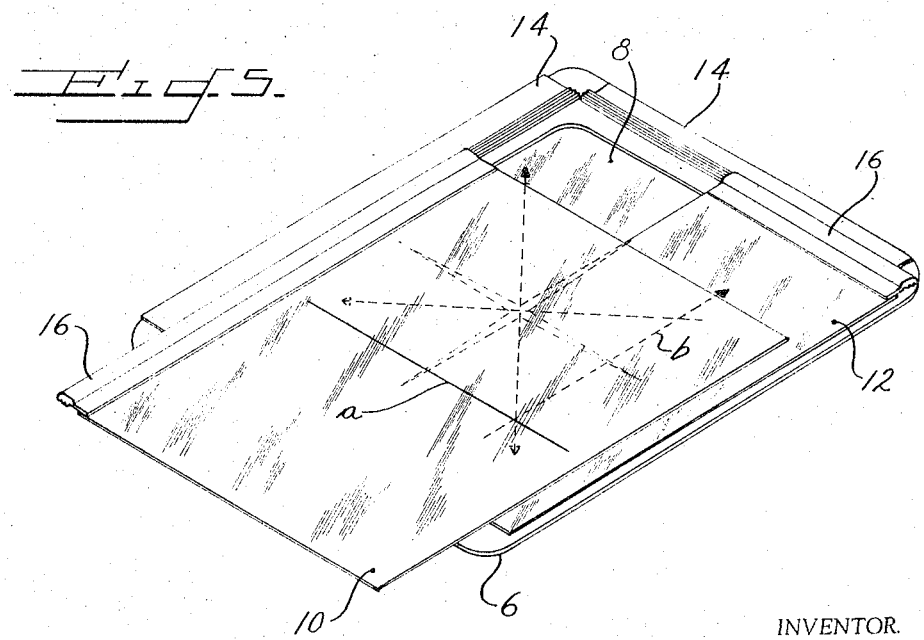
INVENTOR.
BENNETT V. SCHULTZ
BY Chapin + Neal
Attorneys

United States Patent Office 3,299,557
Patented Jan. 24, 1967

3,299,557
PROJECTION TRANSPARENCIES
Bennett V. Schultz, Holyoke, Mass., assignor, by mesne assignments, to National Blank Book Company, Holyoke, Mass., a corporation of Massachusetts
Filed Jan. 6, 1965, Ser. No. 423,730
5 Claims. (Cl. 40—158)

This invention relates to slide transparencies and in particular to transparencies for use in overhead projectors for visual communication, training and education.

The field of visual communication has in recent years assumed great importance for the transmission of ideas and is widely used in the fields of education, business, and in military training programs. There are now available in slide form for overhead projectors, entire courses and course supplementary material. Moreover, the lecturer can prepare additional projection slides, color slides, overlays and even make additional images on slides using grease pencil before or during projection, and can explain and describe the projected image while observing audience reaction.

Projection slides are commonly made up of a plurality of film sheets, and each sheet may, if desired, be made in a different color for a contrasting composite image. Usually one of the sheets is affixed to the frame and is known as a "base" or "static" slide; overlays may be hinged adjacent one or more edges of the frame and may be swung into and out of superposed relation with the image of the static film. Slides of this type are known as "dynamic" slides and a method for preparing them is described in application Serial No. 341,494, filed January 29, 1964, assigned to the same assignee as the instant application.

The principal object of this invention is to provide improved projection transparencies, having overlays hinged to swing into and out of superposed relation with a static transparency disposed in coplanar relation with the frame and slidable in superposed relation parallel to the edge of the frame to which they are hinged.

The above and other objects of this invention will be more readily apparent with the following description and with reference to the accompanying drawings in which:

FIG. 1 is a perspective view showing the slide transparencies embodying this invention;

FIG. 2 is a perspective view showing the slide of FIG. 1 with the overlays disposed in different operative relationships;

FIG. 3 is a section taken along line 3—3 of FIG. 2; and

FIGS. 4 and 5 are perspective views showing the overlays of the slide in various operative relationships.

Referring in detail to the drawings, slide transparencies embodying this invention comprise a mounting frame 6 formed of a relatively stiff or rigid material such as cardboard, plastic or the like. A film sheet 8, hereinafter called a static or base film, is secured to the frame by any suitable means, such as pressure sensitive adhesive strips 9 disposed about the marginal edges of the film 8. The static film 8, secured in the plane of the frame 6, usually bears an image or outline to be supplemented by other image portions on one or more overlays, as shown at 10 and 12. For example, in the drawings, polar and rectangular coordinates are shown reproduced on the base film. The ordinate and abscissa axes are marked conventional X and Y indicia.

The overlays 10 and 12 are slidably and hingedly disposed along the edges of the frame by means of a guideway or slide strip 14 which may be formed of a suitably flexible material such as certain synthetic thermoplastic materials, such as polyethylene, polyvinylchloride, polypropylene or the like.

The slide strip material 14 is formed to include a plurality of parallel undercut grooves or slots 15 which, as shown in FIG. 3, are intermeshed with the grooves of a strip 16 of the same type material affixed to the outer edge portion of the overlays 10 and 12, the strip 16 being slidable along strip 14. The outer edge portion of strip 14 may be attached to the edge portion of the frame 6 by any suitable means including heat sealing or the use of a suitable bonding agent. The strips include a flexible web 17 between the grooved portion and portion bonded to the frame and overlay. The web 17 provides the hinge for free swinging movement of the overlay 16. In one suitable anchoring method shown in the drawings, the edge portion of the frame is perforated, as indicated at 18 in FIGS. 2 and 3, and the outer edge of the strip is fitted around the edge of the frame and heated to its flow temperature so as to flow through the perforations and bond to itself. Instead of the strip 14 being made so as to fit about the edge of the frame, the same result can be achieved by locating a separate thermoplastic anchor strip on the underside of the frame with the heat seal obtained in the same manner.

The slide strip material may be affixed to the outer edge of the overlays in the same manner as to the frame. In this regard, the edge of the overlays may be perforated if necessary, or possibly the edge of the strip 16 may be bonded directly to the edge of the overlays without first perforating them. The slide strip material is essentially flexible and resilient in character so as to form a hinge enabling the overlays to be repeatedly swung to and from their overlying relationship on the static transparency 8, in which position a composite image is projected on the screen made up of the images imprinted on the static and overlay transparencies.

In the simplified illustrated embodiment shown in the drawings, an axis $a$ is reproduced on the overlay 10 and an axis $b$ is reproduced on the overlay 12 normal to the axis $a$. These lines may be reproduced in any suitable color for vivid projection contrast.

Using slides constructed in accordance with this invention, it is usually preferable that the image reproduced on the static slide be first projected on the screen for explanation and instruction by the operator. At this time, the two overlays are disposed outwardly of the static transparency in the manner shown in FIG. 1.

Thereafter, either one or both of the overlays may be swung over the static transparency so that the axes $a$ and/or $b$ are superimposed on the projected base image. The operator may then describe, for example, positive and negative ordinate values in the polar coordinate system while moving the overlay 12 to position the axis $b$ in various locations along the Y axis to coincide with the verbal description. When in the judgment of the operator the audience has had an opportunity to assimilate the concept involved up to that point, he may then swing the next overlay into position over the frame opening so that its image is also projected on the screen to form a complete composite of the images on the static transparencies and the two overlays. In this condition, both overlays can be moved independently parallel to the edge of the frame to which they are hinged, and perpendicular to each other. In FIG. 5, for example, the overlay 10 is shown having been moved to the left so as to represent a negative X value. As shown, the $a$ and $b$ axes now intersect along one of the vectors of the polar coordinate display represented by the arrow 21. The value of this resultant vector, both as to its direction and amplitude may be determined from the visual display by the addition of suitable angular and scalar graduations to the base transparency.

With the sample illustration given, it is apparent that innumerable mathematical and physical combinations can be illustrated using diagrammatic slides embodying this invention in which one or more overlays can be independently swung into and out of projection position and can also be independently moved over the surface of the static slide to achieve visual effects on the screen. For example, relative motion and maneuvering board problems can also be readily illustrated by these projection slides, thus providing a valuable tool to the visual communicationist in education and training.

Having thus described the invention, what is claimed is:

1. Projection slides for overhead projector comprising a frame, a first image bearing transparency affixed in coplanar relationship to said frame, at least one other image bearing movable transparency hingedly and slidably carried on said frame, whereby the latter transparency can be swung into and out of superposed relation with the first transparency and moved edgewise relative to said first transparency while in said superposed relation.

2. Projection slide for overhead projector comprising a frame, a first image bearing static transparency affixed in the plane of said frame, at least one other image bearing transparency slidably movable and hingedly mounted at an edge of said frame, said frame edge and edge of said other transparency having elongated interengaging means controlling said sliding movement whereby the latter transparency is swingable into and out of superposed relation to the first transparency and movable edgewise relative thereto while in said superposed relation.

3. Projection slide for overhead projector comprising a frame defining an opening, a first image bearing film transparency affixed about the opening of said frame, a pair of other image bearing movable film transparencies each hingedly and slidably mounted on adjacent edge portions of said frame, each said frame edge portion and edge of the movable transparency mounted thereon having elongated interengageable means for controlled sliding movement, whereby each of said pair of transparencies can be independently swung into and out of superposed relation to the first transparency and to each other and moved normal to the direction of movement of the other hinged transparency while in said superposed relation.

4. Projection slide for overhead projector comprising a frame made of relatively stiff sheet material, an image bearing film transparency affixed in the plane of said frame, a synthetic plastic slide strip bonded to said frame adjacent at least one edge thereof, and an image bearing transparency having slide means interengaged with the slide strip on the frame, the slide strip of said frame being flexible to enable swinging movement of the transparency into and out of superposed relation to the first transparency, said second transparency being slidable over the surface of the first transparency.

5. Projection slide for overhead projector comprising a frame made of relatively stiff sheet material, a first transparency affixed to said frame in the plane of the frame opening, said frame being perforated along at least one of its outer edges, a strip of thermoplastic slide material linked into said perforations in the frame, a film transparency overlay, another strip of said slide material bonded along one edge of said transparency overlay, said slide material having a plurality of parallel alternate, undercut ribs and grooves running the length thereof, the strip on said overlay being slidably interengaged with the strip affixed to said frame, at least one of said strips having a flexible web portion between the grooved portion and the portions bonded to the frame and overlay thereby providing a hinge for the swinging movement of the overlay into and out of superposed relation with the frame opening.

References Cited by the Examiner

UNITED STATES PATENTS

| | | | |
|---|---|---|---|
| 1,076,257 | 10/1913 | Wiltz | 40—102 |
| 1,715,127 | 5/1929 | Goldman | 40—63 X |
| 2,962,825 | 12/1960 | Bravo | 40—106.1 |

EUGENE R. CAPOZIO, *Primary Examiner.*

W. J. CONTRERAS, *Assistant Examiner.*